(12) United States Patent
Park et al.

(10) Patent No.: US 8,043,743 B2
(45) Date of Patent: Oct. 25, 2011

(54) POUCH TYPE SECONDARY BATTERY WITH IMPROVED SAFETY

(75) Inventors: Hyun Woo Park, Daejeon (KR); Kwang Ho Yoo, Daejeon (KR); Young Joon Shin, Daejeon (KR); Han Ho Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/746,077

(22) PCT Filed: Dec. 18, 2008

(86) PCT No.: PCT/KR2008/007516
§ 371 (c)(1),
(2), (4) Date: Jun. 3, 2010

(87) PCT Pub. No.: WO2009/078680
PCT Pub. Date: Jun. 25, 2009

(65) Prior Publication Data
US 2010/0255368 A1    Oct. 7, 2010

(30) Foreign Application Priority Data

Dec. 18, 2007 (KR) .................. 10-2007-0132956

(51) Int. Cl.
*H01M 8/02* (2006.01)
(52) U.S. Cl. ......... 429/185; 429/162; 429/163; 429/171
(58) Field of Classification Search .................. 429/185, 429/162, 163, 171
See application file for complete search history.

(56) References Cited

U.S. PATENT DOCUMENTS

| 6,387,567 | B1 | 5/2002 | Noh |
| 6,632,538 | B1 | 10/2003 | Yamazaki et al. |
| 2004/0033416 | A1 | 2/2004 | Kim et al. |
| 2004/0038125 | A1 | 2/2004 | Kim et al. |

FOREIGN PATENT DOCUMENTS

| JP | 9-259859 A | 10/1997 |
| JP | 2000-67846 A | 3/2000 |
| JP | 2001-110374 A | 4/2001 |
| JP | 2003-168403 A | 6/2003 |
| JP | 2005-228573 A | 8/2005 |
| JP | 2005-310671 A | 11/2005 |
| JP | 2007-265760 A | 10/2007 |
| KR | 10-2003-0096717 A | 12/2003 |
| KR | 10-2006-0097445 A | 9/2006 |

*Primary Examiner* — Jane Rhee
(74) *Attorney, Agent, or Firm* — Birch, Stewart, Kolasch & Birch, LLP

(57) ABSTRACT

Provided is a pouch-type secondary battery including an electrode assembly, electrode tabs extending outward from the electrode assembly, a pouch-type battery case for housing the electrode assembly, first sealing portions for sealing the pouch-type battery case and the electrode tabs, and second sealing portions formed at positions with the exception of electrode tab-positioned sites between the first sealing portions and the electrode assembly. The secondary battery is configured to have a structure such that a channel is formed with electrode tab portions by further sealing inside portions of the electrode tabs with the exception of electrode tab-occupied portions. Such a structure allows for easy unidirectional discharge of gases even when the battery inside reaches a certain level of internal pressure due to evolution of gases and enables previous expectation of the gas discharge direction. Therefore, it is possible to provide a secondary battery with improved safety.

6 Claims, 3 Drawing Sheets

[Fig. 1]
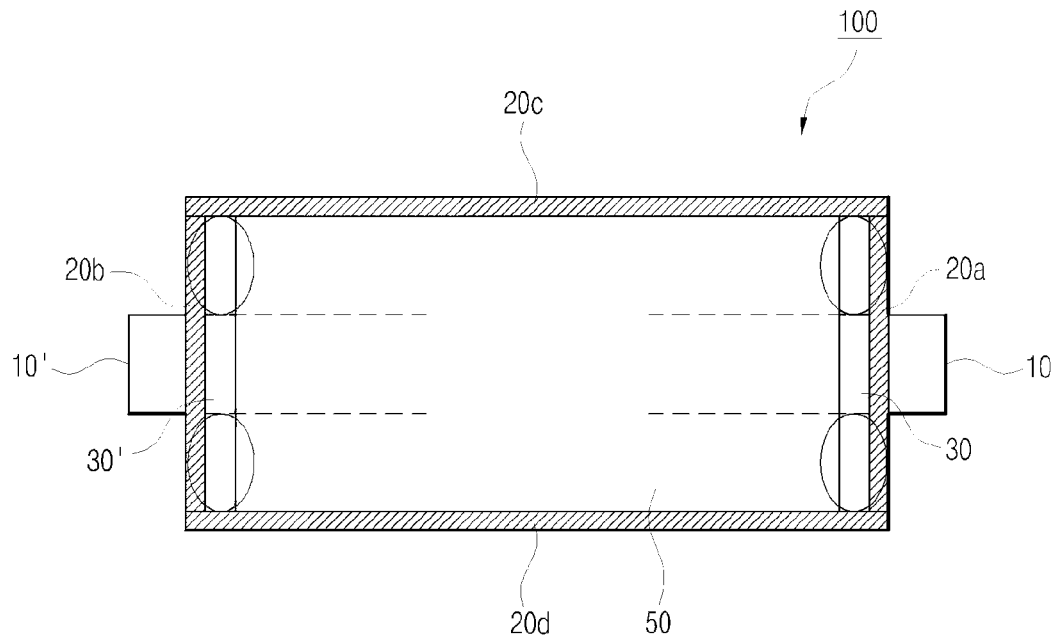
[Fig. 2]
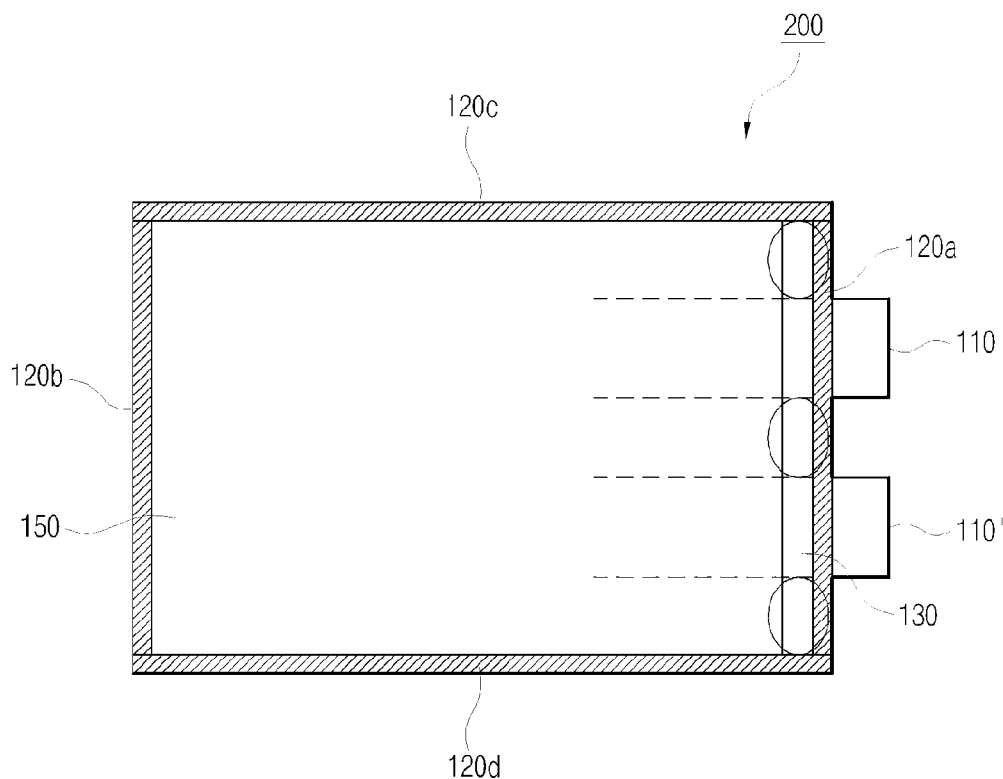

[Fig. 3]
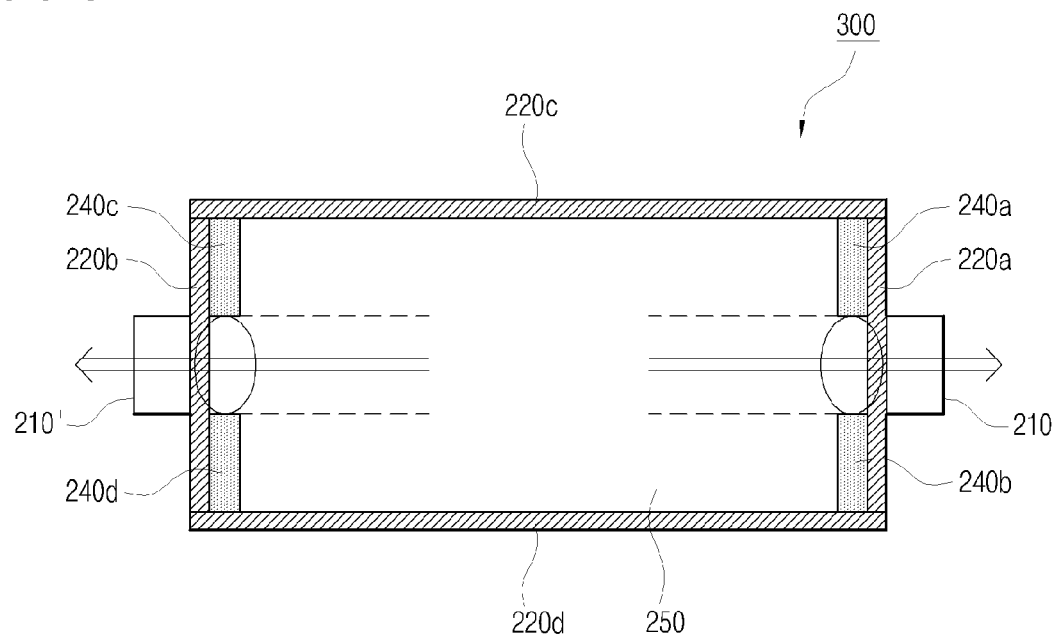
[Fig. 4]
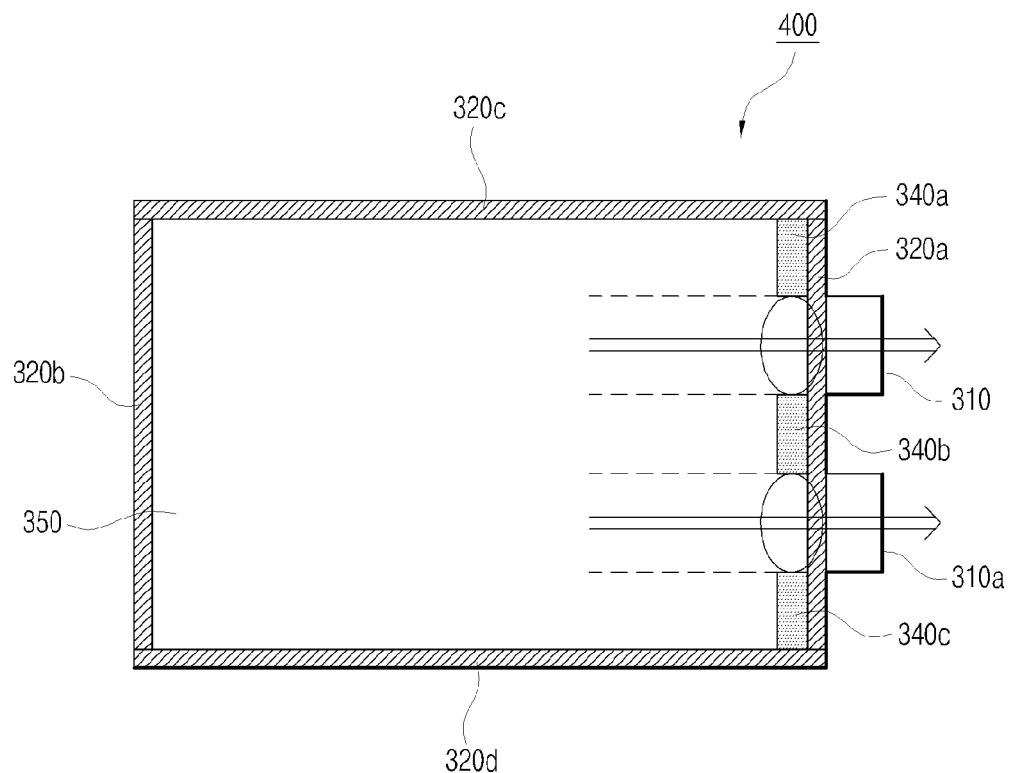

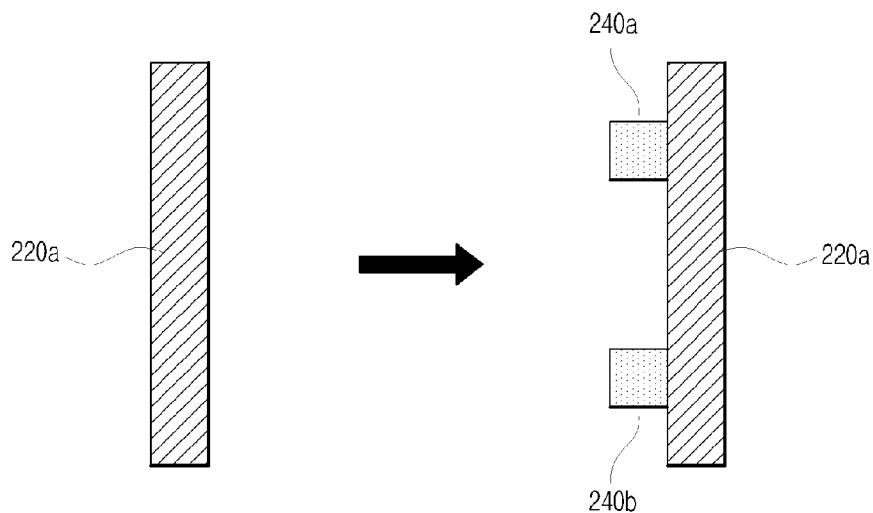
[Fig. 5]
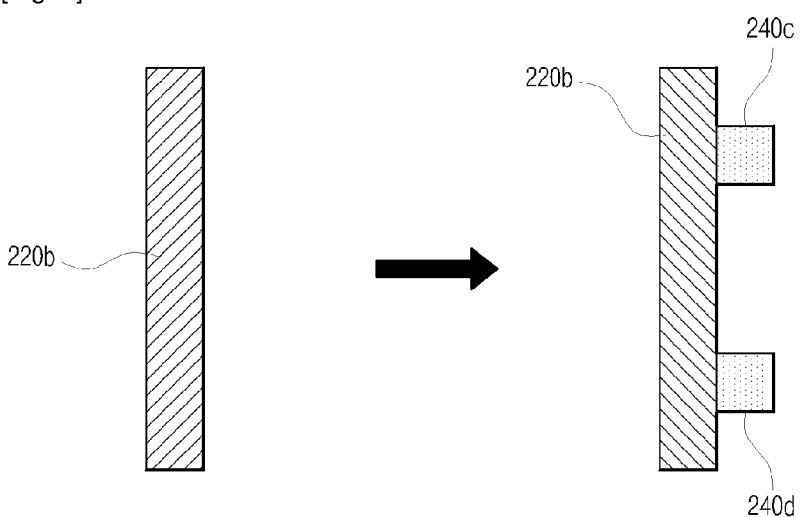
[Fig. 6]
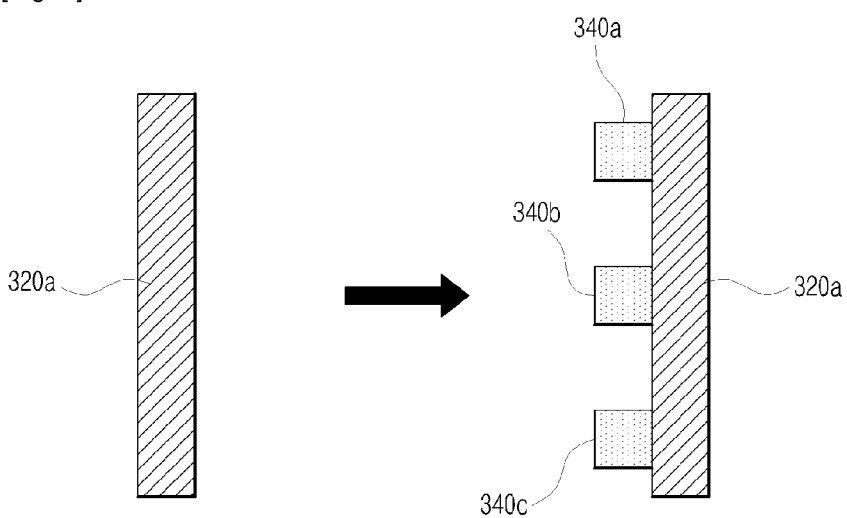
[Fig. 7]

POUCH TYPE SECONDARY BATTERY WITH IMPROVED SAFETY

TECHNICAL FIELD

The present invention relates to a pouch type secondary battery with improved safety. More specifically, the present invention relates to a pouch type secondary battery which is capable of achieving improved safety by sealing a non-overlapped portion between an electrode tab and a pouch to make a channel between a battery cell and a tab-sealing portion, such that gases generated from the inside of the battery can be discharged only in the direction of the electrode tab.

BACKGROUND ART

Technological development and increased demand for mobile equipment have led to a rapid increase in the demand for secondary batteries as an energy source. To keep with such current trends, a great deal of research and stilly has been focused on development of batteries that can meet various requirements of consumers.

In terms of the battery shape, there is a great demand for rectangular batteries and pouch-type batteries which have a slim thickness and are therefore applicable to electronic products such as mobile phones. In terms of the battery material, there is a great demand for lithium secondary batteries such as lithium cobalt polymer batteries, which have excellent energy density, discharge voltage and safety.

One of main research goals regarding the secondary battery is to improve safety of the battery. Generally, the lithium secondary battery may undergo explosion of the battery die to high internal temperature and pressure thereof which may result from abnormal operation conditions of the battery, such as internal short circuit, excessive charged state over an acceptable level of electric current and voltage, exposure of the battery to high temperatures, and external impact such as falling. For example, the pouch-type secondary battery is susceptible to the risk of an internal short circuit when it is exposed to external impact such as falling or application of force from the outside.

In recent years, rechargeable secondary batteries are widely used as an energy source for wireless mobile equipment. In addition, secondary batteries have also drawn a great deal of attention as a power source for electric vehicles (EVs) and hybrid electric vehicles (HEVs) which are presented as countermeasures capable of solving problems of air pollution caused by fossil-fuel driven vehicles such as gasoline vehicles and diesel vehicles.

Median/large-size devices such as motor vehicles require a high-power, large-capacity power source. For this purpose, a median/large-size battery system with electrical connection of multiple battery cells is typically employed. The pouch-type lithium ion polymer secondary battery, which is widely used as a unit battery in such a middle or large-sized battery system, has a relatively large size, as compared to the same class of other batteries which are used in small-sized devices.

The pouch-type polymer secondary battery is typically comprised of an electrode assembly, electrode tabs extending outward from the electrode assembly, electrode leads welded to the electrode tabs, and a pouch for housing the electrode assembly and formed of a laminated sheet of a polymer resin and aluminum.

Referring to FIG. 1, a lithium ion (polymer) battery 100 has electrode tabs 10,10' protruding outward therefrom to ensure a flow of electric current. Therefore, sealing of the pouch including the electrode tabs 10,10' should be made to finish final assembly of the battery. Here, sealing is made on four sides 20a,20b,20c,20d where the pouch and electrode tabs are overlapped with each other. Unfortunately in this case, substantially no sealing is achieved in inside portions 30,30' of the electrode tabs, so adhesive strength is weak in the region (as indicated by the circle) where the electrode tabs 10,10' and sealing portions are not overlapped with each other. As a consequence, there is a high possibility of gas discharge toward the region which will have poor adhesive strength upon sealing of the external pouch structure and the electrode tabs.

Such an undesirable event takes place in the configuration of FIG. 2 where the electrode tabs are installed parallel to each other on either side of the battery as well as in the configuration of FIG. 1 where the electrode tabs are installed on both top and bottom sides of the battery.

In a conventional lithium ion (polymer) battery, sealing of the electrode tabs was performed only on electrode tab-pouch overlap portions 20a,20b,20c,20d,120a,120b,120c,120d, as shown in FIGS. 1 and 2.

In such a case, discharge of gases takes place in unexpected regions (as indicated by the circle), which may result in difficulties associated with a design of a battery pack for HEVs. Multidirectional venting of gases from the inside of the battery pack, not unidirectional venting of gases, does not allow easy discharge of gases to the outside. Further, although discharge of internal gases should be achieved more quickly to secure safety of the battery upon evolution of gases inside the battery, a conventional battery is highly vulnerable to significant deterioration of the battery safety due to an extended period of time required for venting gases.

To this end, there is a strong need for development of a secondary battery having a safety device that is capable of preventing rupture or explosion of the battery by blocking evolution of gases in the battery inside through release of high pressure conditions when the battery reaches a given level of internal pressure.

DISCLOSURE OF INVENTION

Technical Problem

Therefore, the present invention has been made in view of the above problems associated with a variety of safety risk factors occurring when a pouch-type secondary battery is overcharged or is exposed to high temperature conditions.

Technical Solution

In a pouch-type secondary battery in accordance with the present invention, discharge of gases is allowed only to a tab-sealing portion, through the formation of a channel in the cell inside and electrode tab-sealing portion, by further inclusion of second sealing portions at positions except for the electrode tab-positioned sites, among the inside region of a pouch where electrode tabs are positioned, as well as by provision of first sealing portions in the regions where the electrode tabs and the pouch overlap with each other. According to such a structural configuration, gases can easily escape from the inside of the pack to the outside due to a unidirectional vent of the battery if any, and a vent of the battery is readily allowed to thereby improve the battery safety.

Therefore, an object of the present invention is to provide a pouch type secondary battery with improved safety, which is configured such that explosion of the battery takes place in one direction even upon application of external pressure or heat, or gases generated inside the battery are vented in one direction.

Advantageous Effects

As will be described in name detail hereinafter, a pouch-type secondary battery of the present invention is configured in a manner that when gases evolve inside the battery, unidirectional discharge of gases is allowed through the formation of a channel using sealing portions of electrode tabs. Therefore, it is possible to easily design a safer battery pack and safety device. Further, the present invention provides a pouch type secondary battery with improved safety, because discharge of gases is name easily achieved when the inside of the battery reaches a certain level of pressure.

BRIEF DESCRIPTION OF THE DRAWINGS

FIG. 1 shows a conventional pouch-type secondary battery having electrode tabs formed on both sides thereof;

FIG. 2 shows a conventional pouch-type secondary battery having electrode tabs formed on either side thereof;

FIG. 3 shows a pouch-type secondary battery having at least one second sealing portions in accordance with one embodiment of the present invention;

FIG. 4 shows a pouch-type secondary battery having at least one second sealing portions in accordance with another embodiment of the present invention; and FIGS. 5, 6 and FIG. 7 show formation of second sealing portions on a first sealing portion in accordance with one embodiment of the present invention.

BEST MODE FOR CARRYING OUT THE INVENTION

In accordance with an aspect of the present invention, the above and other objects can be accomplished by the provision of a pouch-type secondary battery including an electrode assembly, electrode tabs extending outward from the electrode assembly, a pouch-type battery case for housing the electrode assembly, first sealing portions for sealing the pouch-type battery case and the electrode tabs, and second sealing portions formed at positions with the exception of electrode tab-positioned sites between the first sealing portions and the electrode assembly.

Hereinafter, the present invention will be described in name detail with reference to the accompanying drawings.

When electrode tabs are disposed on both opposite sides of the battery, the pouch-type secondary battery in accordance with the present invention includes, as shown in FIG. 3, electrode tabs 210,210' of negative and positive electrodes extending from an electrode assembly 250 consisting of a negative plate, a separator and a positive plate (not shown); a pouch-type battery case (not shown) for housing the electrode assembly 250; first sealing portions 220a,220b,220c,220d for sealing the battery case and the electrode tabs 210,210'; and second sealing portions 240a,240b,240c,240d at positions with the exception of the electrode tab-positioned sites between the first sealing portions 220a,220b,220c,220d and the electrode assembly 250.

Hereinafter, preparation of the pouch-type secondary battery in accordance with the present invention will be described. First, the electrode assembly 250 is prepared. The electrode assembly 250 includes a positive electrode to which a positive active material is applied, a negative electrode to which a negative active material is applied, and a separator disposed between the positive and negative electrodes and preventing a short circuit between the positive and negative electrodes and allowing for only migration of lithium ions.

The positive active material that can be used in the present invention may be a chalcogenide compound. Examples of the positive active material may include composite metal oxides such as $LiCoO_2$, $LiMn_2O_4$, $LiNiO_2$, $LiNi_{1-x}Co_xO_2$ ($0<x<1$), $LiMnO_2$, etc.

Examples of the negative active material may include carbon (C)-based materials, Si, Sn, tin oxides, composite tin alloys, transition metal oxides, lithium metal nitrides or oxides, etc. Typically, the positive collector is formed of aluminum (Al), the negative collector is formed of copper (Cu), and the separator is formed of polyethylene (PE) or polypropylene (PP). However, the present invention is not limited thereto.

Further, the positive collector is formed typically of aluminum (Al) and is attached to a positive electrode tab which protrudes upward to a given length from the positive collector. Even though there is no particular limit to the material for the negative collector, it is formed typically of nickel (Ni) and is attached to a negative electrode tab which protrudes downward to a given length from the negative collector.

The electrode assembly 350 is prepared, and a pouch is prepared for accommodation of the electrode assembly 350. The pouch is composed of a metal layer formed of a metal material such as aluminum (Al), a hot-melting layer formed on an upper surface of the metal layer, and an insulating film formed on a lower surface of the metal layer.

The hot-melting layer is formed of modified polypropylene, for example casted-polypropylene (CPP) and serves as an adhesive layer. The insulating film may be formed of a resin material such as nylon or polyethylene terephthalate (PET). The structure and material of the pouch are not limited thereto.

The pouch has a receiving part with an internal space to receive the electrode assembly 350 and is composed of upper and lower parts that are combined following placement of the electrode assembly 350 in the receiving part.

The upper and lower parts of the pouch receive the electrode assembly 350 and the electrode tabs and are combined with each other by means of the first sealing portions 220a, 220b,220c,220d. After preparation of the pouch is complete, the electrode assembly is housed in the receiving part for accommodating the electrode assembly and provided in the lower part of the pouch. Here, the electrode assembly is placed in the receiving part of the lower part of the pouch. Under the placement state of the electrode assembly, the electrode tabs 210, 210' of the electrode assembly are partially protruded to the outside of the pouch.

The battery of the present invention further includes second sealing portions at regions which correspond to inside portions of the first sealing portions with the exception of the electrode tabs and where the electrode tabs substantially extend.

When the second sealing portions are provided as above, internal electrode tab portions (as indicated by the circle) containing no second sealing portions and extending in the direction of the electrode assembly are expected to have relatively low adhesive strength. According to such a configuration, a channel connecting between the battery inside and the electrode tab is formed, so gases are vented only in the direction where the electrode tabs are positioned (as indicated by the arrow), when the battery reaches a certain level of internal pressure due to generation of gases. That is, the structure is configured to have the second sealing portions at all the positions except for electrode tab-positioned sites inside the sealing portions between the pouch case and electrode tabs. Therefore, the battery of the present invention is designed such that the risk of battery rupture at positions where the electrode tabs are not located is maximally reduced and discharge of gases can take place only to the sealing portions (arrow direction) of the electrode tabs.

On the other hand, when electrode tabs in accordance with the present invention are positioned unidirectionally, that is, parallel to each other on either side of the battery, the pouch-type secondary battery includes, as shown in FIG. 4, electrode tabs 310,310' of negative and positive electrodes extending from an electrode assembly 350 consisting of a negative plate, a separator and a positive plate (not shown); a pouch-type battery case (not shown) for housing the electrode assembly 350; first sealing portions 320a,320b,320c,320d for sealing the battery case and the electrode tabs 310,310'; and second sealing portions 340a,340b,340c,340d at positions with the exception of the electrode tab-positioned sites between the first sealing portions 320a,320b,320c,320d and the electrode assembly 350.

Meanwhile, formation of the second sealing portions may be carried cut, as shown in FIGS. 5, 6 and FIG. 7, with modification of a sealing tool by altering a 1-shaped tool only including the first sealing portions 220a,220b,320a,320b to include shapes of second sealing portions 240a,240b,240c, 240d,340a,340b,340c,340d.

Further, the second sealing portion is preferably formed to have a thickness of 250±20 μm, so as to have strength enough to withstand pressure of leaking liquids and gases.

The electrode assembly, which is contained in a battery case of the secondary battery in accordance with the present invention, may have a variety of structures such as stack structures, jelly-roll (winding) structures, etc. Generally, a secondary battery may be categorized, for example, into a lithium ion battery, a lithium ion polymer battery, a lithium polymer battery, and the like, depending upon structures of an electrode assembly, compositions of an electrolyte, etc. In the context of the present invention, preferred is a lithium ion polymer battery which can be fabricated at low production costs, is less susceptible to the risk of liquid leakage, and can be easily and conveniently assembled by a simple process.

The lithium ion polymer battery is typically fabricated by placing an electrode assembly of positive electrode/separator/negative electrode in a pouch-type battery case made of an aluminum laminate sheet, followed by impregnation with an electrolyte, and applying high temperature and high pressure to a joining site to hot-melting seal the battery case.

One ends of electrode leads are positioned inside the case while being attached to electrode tabs of the electrode assembly. The other opposite ends of the electrode leads are exposed to the outside of the case. Out of the electrode leads, a positive electrode lead is typically formed of aluminum foil, whereas a negative electrode lead is typically formed of copper foil. The electrode tabs are conventionally attached to the electrode leads by spot welding. The electrode lead has a thickness of approx. 200 to 500 μm.

The resin sheet is interposed into a joining site between the battery case and the electrode leads. Generally, the sheet is formed of a polymer resin, such as PP and PE and has a thickness of 100 to 300 μm.

MODE FOR THE INVENTION

Now, the present invention will be described in name detail with reference to the following Examples. These examples are provided only for illustrating the present invention and should not be construed as limiting the scope and spirit of the present invention.

EXAMPLE 1

Fabrication of a Secondary Battery Having Second Sealing Portions in a Structure Including Electrode Tabs Formed on Both Sides of the Battery A negative electrode tab of a 0.3 mm-thick copper was prepared which is attached to a negative collector of an electrode assembly consisting of a negative electrode/separator/positive electrode. Then, aluminum foil (for a positive electrode lead) and copper foil (for a negative electrode lead) were respectively welding-attached to the corresponding electrode tabs. Next, as shown in FIGS. 5 and 6, a secondary battery with formation of second sealing portions (250±20 μm) was fabricated with modification of a sealing tool. The electrode assembly was placed in a pouch-type case made of an aluminum laminate sheet, and a carbonate-based lithium electrolyte containing 1M LiPF6 was then injected thereto, followed by thermal fusion of the sheet to fabricate a lithium ion polymer battery.

EXAMPLE 2

Fabrication of a Secondary Battery Having Second Sealing Portions in a Structure Including Electrode Tabs Formed on Either Side of the Battery A lithium ion polymer battery was fabricated in the same manner as in Example 1, except that second sealing portions (250±20 μm) were formed with modification of a sealing tool, as shown in FIG. 7.

COMPARATIVE EXAMPLE 1

A lithium ion polymer battery was fabricated in the same manner as in Example 1, except that second sealing portions were not formed.

EXPERIMENTAL EXAMPLE 1

Safety of the secondary batteries fabricated in Examples 1 and 2 and Comparative Example 1 was measured. The results thus obtained are given in Table 1 below.

TABLE 1

|  | Comparative Example 1 | Examples 1 and 2 |
|---|---|---|
| Vent direction | Venting of gases at sides of cell | Venting of gases to electrode tabs |

From the results of Table 1, it can be seen that formation of second sealing portions as in the present invention resulted in venting of gases to the electrode tabs, whereas no installation of second sealing portions as in Comparative Example 1 resulted in venting of gases in the non-uniform direction and toward a weak sealing part.

The invention claimed is:
1. A pouch-type secondary battery comprising:
an electrode assembly,
electrode tabs extending outward from the electrode assembly;
a pouch-type battery case for housing the electrode assembly;

first sealing portions for sealing the pouch-type battery case and the electrode tabs; and second sealing portions extending from the first sealing portions between the first sealing portions of the surface where the electrode tabs are located and the electrode assembly, wherein the second sealing portions are formed at positions with the exception of electrode tab-positioned sites.

2. The secondary battery according to claim 1, wherein the second sealing portions are formed with modification of a sealing tool, such that the second sealing portions are disposed at non-electrode tab-positioned sites on the first sealing portions.

3. The secondary battery according to claim 1, wherein the electrode tabs are positioned on both sides of the electrode assembly.

4. The secondary battery according to claim 1, wherein the electrode tabs are positioned on either side of the electrode assembly.

5. The secondary battery according to claim 1, wherein the second sealing portion has a thickness of 250±20 μm.

6. The secondary battery according to claim 1, wherein the battery is a lithium secondary battery.

* * * * *